United States Patent
Felke et al.

(10) Patent No.: US 9,672,228 B2
(45) Date of Patent: *Jun. 6, 2017

(54) METHODS AND SYSTEMS FOR CREATING A COMPLEX USER INTERFACE ADAPTING A GENERIC DATABASE SOFTWARE APPLICATION TO INDIVIDUALLY MANAGE SUBSET DOMAINS IN COMPLEX DATABASE

(71) Applicant: HONEYWELL INTERNATIONAL INC., Morristown, NJ (US)

(72) Inventors: Tim Felke, Glendale, AZ (US); Jeff Vanderzweep, Peoria, AZ (US); Nagabhushana Rao Begur, Glendale, AZ (US); Raghupathy Kolandavelu, TamilNadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/794,155

(22) Filed: Mar. 11, 2013

(65) Prior Publication Data

US 2014/0258344 A1 Sep. 11, 2014

(51) Int. Cl.
*G06F 17/30* (2006.01)
*G06N 5/02* (2006.01)

(52) U.S. Cl.
CPC ......... *G06F 17/30289* (2013.01); *G06N 5/02* (2013.01)

(58) Field of Classification Search
CPC ........... G06F 17/2785; G06F 17/30734; G06F 17/30634; G06F 17/30595; G06F 17/30731
See application file for complete search history.

(56) References Cited

U.S. PATENT DOCUMENTS 5,682,535 A * 10/1997 Knudsen ...................... 717/117
6,212,524 B1    4/2001 Weissman et al.
(Continued)

FOREIGN PATENT DOCUMENTS

| EP | 2779035 | * | 9/2014 |
| WO | 9960492 | | 11/1999 |
| WO | 2008127586 A2 | | 10/2008 |

OTHER PUBLICATIONS

Silingas et al.; "Domain-Specific Modeling Environment Based on UML Profiles"; by Lithuanian State Science and Studies Foundation according to High Technology Development Program Project; created on Apr. 6, 2009; 12 pages.*

(Continued)

*Primary Examiner* — Monica Pyo
(74) *Attorney, Agent, or Firm* — Lorenz & Kopf, LLP

(57) ABSTRACT

Methods are provided for creating a complex user interface using a generic computer readable database software application to manage only a specific data subset domain of the database in accordance with a work package. The method comprises creating metadata defining a data subset domain, the metadata including a task specification, a report specification and a view specification and defining attribute metadata, entity metadata and relationship metadata for the data subset domain. The method also comprises data package specification for the data subset domain, specifying a data package hierarchy within the data subset domain, specifying user groups for the data subset domain, specifying view specifications for the user groups. Further the view specification is associated with the task specification and the report specification after which the generic software application is released to a user.

10 Claims, 9 Drawing Sheets

(56) References Cited

U.S. PATENT DOCUMENTS

| | | | |
|---|---|---|---|
| 6,792,431 | B2 | 9/2004 | Tamboli et al. |
| 6,988,095 | B1 | 1/2006 | Dorfman |
| 7,313,561 | B2 | 12/2007 | Lo et al. |
| 7,509,374 | B2 | 3/2009 | Trinh et al. |
| 7,739,224 | B1 | 6/2010 | Weissman |
| 7,747,632 | B2 | 6/2010 | Korn et al. |
| 7,809,749 | B2 | 10/2010 | Ho et al. |
| 7,941,438 | B2* | 5/2011 | Molina-Moreno ....... G06F 8/35 707/756 |
| 8,291,096 | B2 | 10/2012 | Stone et al. |
| 8,332,782 | B1 | 12/2012 | Chang et al. |
| 8,352,450 | B1 | 1/2013 | Mraz et al. |
| 9,009,585 | B1 | 4/2015 | Chetrit et al. |
| 2001/0029527 | A1 | 10/2001 | Goshen |
| 2002/0062475 | A1 | 5/2002 | Iborra |
| 2003/0145124 | A1 | 7/2003 | Guyan et al. |
| 2003/0229610 | A1* | 12/2003 | Van Treeck ........................ 707/1 |
| 2004/0158455 | A1 | 8/2004 | Spivack et al. |
| 2005/0028158 | A1 | 2/2005 | Ferguson et al. |
| 2005/0138078 | A1 | 6/2005 | Christenson et al. |
| 2005/0216503 | A1 | 9/2005 | Charlot et al. |
| 2005/0262498 | A1 | 11/2005 | Ferguson et al. |
| 2006/0047643 | A1 | 3/2006 | Chaman |
| 2006/0053099 | A1 | 3/2006 | Gardner et al. |
| 2006/0080301 | A1 | 4/2006 | Cole |
| 2006/0155687 | A1 | 7/2006 | Chou |
| 2006/0200792 | A1 | 9/2006 | Hagstrom et al. |
| 2006/0282302 | A1 | 12/2006 | Hussain |
| 2007/0299823 | A1 | 12/2007 | Getsch et al. |
| 2009/0037829 | A1 | 2/2009 | Sun et al. |
| 2009/0240677 | A1 | 9/2009 | Parekh et al. |
| 2010/0217758 | A1* | 8/2010 | Weissman et al. ........... 707/713 |
| 2010/0293027 | A1 | 11/2010 | Du Fosse |
| 2011/0320086 | A1* | 12/2011 | Kolandavelu et al. ......... 701/29 |
| 2013/0054526 | A1 | 2/2013 | Di Vincenzo |
| 2014/0250153 | A1 | 9/2014 | Nixon et al. |
| 2015/0012476 | A1 | 1/2015 | Seng et al. |

OTHER PUBLICATIONS

Eric Engstroml; "DOME (Domain Modeling Environment) Application to the AADL"; AES Technology Centers of Excellence, Honeywell Technology; 2005; 25 pages.*

Chaffin M., et al.; Managing Metadata in SQL Server 2005, Published Mar. 15, 2006.

Ni Q., et al.; A Configuration-based flexible reporting method for enterprise information systems; PORTAL, The Guide to Computing Literature, vol. 58, Issue 5 (Jun. 2007), pp. 416-427, ISSN:0166-3615.

Shijian Lu, et al.; Tamot: Towards a Flexible Task Modeling Tool; CSIRO/MIS, Locked Bag 17, North Ryde, NSW 1670, Australia; Department of Computer Science, Calvin College, Grand Rapids, MI.

Shah Rukh Humayoun, et al.; Task-based User-System Interaction, FACHBEITRAG; Accepted: Dec. 20, 2011/Published online: Jan. 18, 2012; Springer-Verlag 2012.

The OWL Services Colaition: "OWL-S: Semantic Markup for Web Services—Version 1.0", Internet Citation, Nov. 1, 2003, pp. 1-25, XP002620258, Retrieved from the internet: URL:http://www.ai.sri.com/daml/services/owl-s/[retreived on Jan. 24, 2010].

Ben Adida: "RDFa in XHTML: Syntax and Processing", Oct. 14, 2008, pp. 1-50, XP055152401, Retrieved from the internet: URL:http://www.w3.org/TR/2008/REC-rdfa-syntax-20081014/ [retreived on Nov. 11, 2014].

Dan Brickley: "FOAF Vocabulary Specification", Aug. 9, 2010, XP055152416, Retrieved from Internet: URL:http://xmlns.com/foaf/spec/20100809.html [retreived on Nov. 11, 2014].

Boris Morik: "OWL 2 Web Ontology Language Structural Specification and Functional-Style Syntax (Second Edition)", Dec. 11, 2012, pp. 1-62 XP055152503, Retreived from internet: URL:http://www.w3.org/TR/owl2-syntax/ [retreived on Nov. 12, 2014].

EP Search Report for Application EP 14157401.2 dated Nov. 28, 2014.

EP Examination Report for Application No. EP 14157401.2 dated Jan. 9, 2015.

EP Extended Search Report for Application No. EP 14177350.7 dated Jan. 22, 2015.

USPTO Office Action for U.S. Appl. No. 13/952,249 dated Apr. 20, 2015.

USPTO Office Action for U.S. Appl. No. 13/952,249; Notification date Aug. 7, 2015.

EP Extended Search Report for Application No. 15191548.5 dated Dec. 17, 2015.

USPTO Office Action for U.S. Appl. No. 13/952,249 dated Dec. 1, 2015.

USPTO Final Office Action for U.S. Appl. No. 13/952,249 date mailed Jun. 16, 2016.

USPTO Notice of Allowance for U.S. Appl. No. 13/952,249 date mailed Oct. 5, 2016.

USPTO Office Action Notification date Dec. 22, 2014; U.S. Appl. No. 13/794,155.

* cited by examiner

METHODS AND SYSTEMS FOR CREATING A COMPLEX USER INTERFACE ADAPTING A GENERIC DATABASE SOFTWARE APPLICATION TO INDIVIDUALLY MANAGE SUBSET DOMAINS IN COMPLEX DATABASE

TECHNICAL FIELD

The present invention generally relates to database management, and more particularly relates to a knowledge management system (KMS) for specifying a subset of entity types, data relationships and attributes from the full data model that are visible to a user in a context defined by a specific use objective.

BACKGROUND

A database (DB) is an organized collection of data for one or more purposes, usually in digital form. The data are typically organized to model relevant aspects of reality (for example, the availability of seats on an aircraft), in a way that supports processes requiring this information (for example, finding an aircraft with seats available). This definition is very general, and is independent on the type of technology used.

The term "database" may be narrowed to specify particular aspects of the organized collection of data and may refer to the logical database, to physical database as data content in computer data storage or to many other database sub-definitions. The term database is correctly applied to the data and their supporting data structures, and not to an associated database management system DMBS. The database data collection with a DBMS is referred to herein as a database system.

A Knowledge management System ("KMS") is an application that is built on top of a DBMS and manipulates data within the structure of a DBMS. While a DBMS contains facts, A KMS adds rules and relationships to those facts to convert the facts into a model that can be used by software to automatically make further inference and decisions.

The term database system implies that the collection of data is managed to some level of quality (measured in terms of accuracy, availability, usability, and resilience) and this in turn often implies the use of a general-purpose database management system (DBMS). A general-purpose DBMS is typically a complex software system that meets many usage requirements, and the databases that it maintains are often large and complex. The utilization of databases is now spread to such a wide degree that virtually every technology and product relies on databases and DBMSs for its development and commercialization, or even may have such embedded in it. Well known exemplary DBMSs include Oracle, IBM DB2, Microsoft SQL Server, PostgreSQL, MySQL and SQLite. A DBMS also needs to provide effective run-time execution to properly support (e.g., in terms of performance, availability, and security) as many end-users as needed.

The design, construction, and maintenance of a complex database has historically required the skills of a specialist, whose tasks are supported by specialized computer tools provided either as part of the DBMS or as stand-alone software products. These tools include specialized database languages including data definition languages (DDL), data manipulation languages (DML), and query languages. These can be seen as special-purpose programming languages, tailored specifically to manipulate databases; sometimes they are provided as extensions of existing programming languages, with added database commands. The most widely supported database language is SQL, which has been developed for the relational data model and combines the roles of DDL, DML, and a query language.

However, the common every day user is not a skilled database programmer. Oft times the user is left to his own devices to use standard one-size-fits all query tools and data presentations. Although data presentations are known that sort results by subject relevancy, those data presentations are typically rendered as a list of documents pages long with mere summary lines attempting to describe the data contained in each. Hence, there is a need for methods to alleviate the need for special programming skills to efficiently retrieve desired data from large complex data bases and to provide the most useful display of the requested information.

BRIEF SUMMARY

A computer executed method is provided for creating a complex graphical user interface on a display device via generic computer readable database software that is executable on a processor to manage only a specific data subset domain of the application data in a database. The method comprises creating metadata defining a data subset domain, the metadata including a Task Specification, a Report Specifications and a View Specification and defining Attribute metadata, Entity metadata and Relationship metadata for the data subset domain. The method further comprises specifying Data Package Specification for the data subset domain, a Data Package hierarchy within the data subset domain, a user group for the data subset domain, a View Specification for the user groups and associating the View Specification with the Task Specification and the Report Specification. The generic software application is then released to a user.

A computer program product is provided on a non-transitory storage medium comprising steps for creating a complex graphical user interface on a display device via generic computer readable database software to manage only a specific data subset domain of application data in a database. The steps comprise creating metadata defining a data subset domain, the metadata including a Task Specification, a Report Specifications and a View Specification and defining Attribute metadata, Entity metadata and Relationship metadata for the data subset domain. The method further comprises specifying Data Package Specification for the data subset domain, a Data Package hierarchy within the data subset domain, a user group for the data subset domain, a View Specification for the user groups and associating the View Specification with the Task Specification and the Report Specification. The generic software application is then released to a user.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
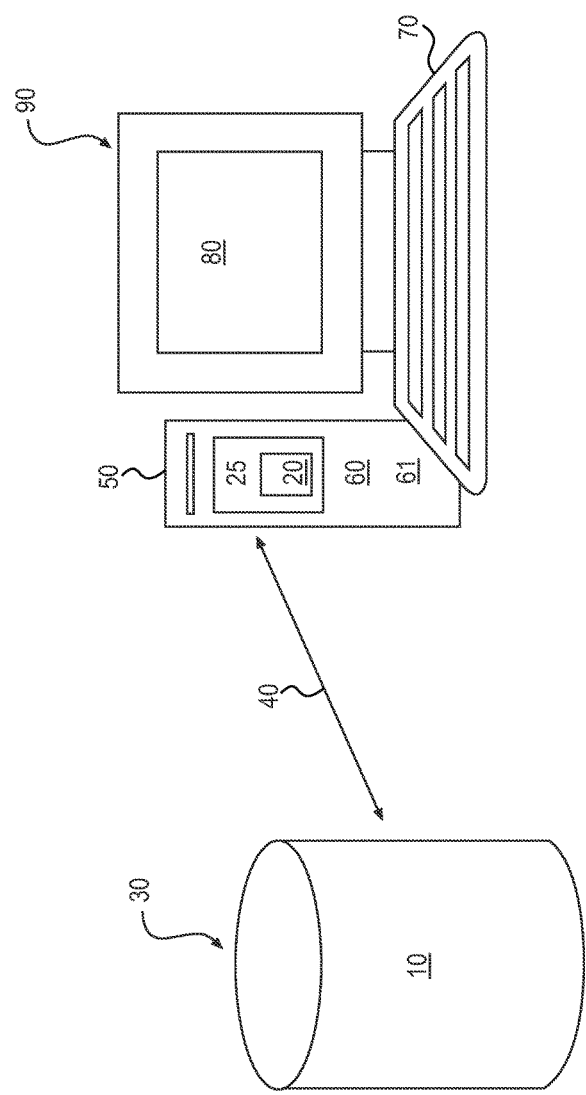
FIG. 1 is a simplified block diagram of a database system.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, firmware or computer software executing on a computing device, or combinations thereof. Some of the embodiments and implementations are described above in terms of functional and/or logical block components (or modules) and various processing steps. However, it should be appreciated that such block components (or modules) may be realized by any number of hardware, executable software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein are embodied directly in hardware, firmware, in a software module executed by a processor, or in a combination of thereof. A software module may reside in RAM memory, flash memory, ROM memory, EPROM memory, EEPROM memory, registers, hard disk, a removable disk, a CD-ROM, or any other form of storage medium known in the art including a processor. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner and through one or more additional elements or components.

While at least one exemplary embodiment will be presented in the following detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The subject matter provided herein discloses a KMS featuring a mechanism through which a generic software application (the "Application") for management of complex knowledge bases can be adapted to address specific, narrow data domain access at much lower cost than other existing approaches. This management is accomplished through the use of a generic set of declarative data structures (i.e., Metadata) and associated generic software along with a limited domain specific set of database tables to automatically produce HTML pages and associated scripts to allow users to navigate through a domain specific data set and to modify its content. The Metadata and generic software provide a mechanism to model a subset of a database that is visible to each user as they perform specific tasks to build the knowledge base and the specific steps for each task.

The specification(s) of the structures for entities, attributes and relationships for a data Model constitute the Metadata for that Model. A Model is a large group of data elements and data structure specifications that supports automatic data inference and decision making. The Model contains Entity Metadata, Attribute Metadata, and Relationship Metadata.

Relationship Metadata is the collection of relationship specifications that have been defined for the system. A relationship captures how entities are related to one another. Relationships can be thought of as verbs, linking two or more nouns. Examples: An aircraft has engine relationship links aircraft and the engine. Aircraft has failure modes relationship links aircraft and all the related failure modes. A failure mode has symptoms relationship links a failure mode to symptoms. A recursive relationship is one in which the same entity participates more than once in the relationship.

Entity Metadata is the collection of Entity Specs that have been defined for the system. An entity-type is a category. An entity, strictly speaking, is an instance of a given entity-type. There are usually many instances of entity-types. Because the term entity-type is somewhat cumbersome, most people tend to use the term entity as a synonym for this term. Entity Types can be thought of as common nouns and entities can be thought of as proper nouns. Examples: a computer, aircraft, navy ship, automobile, tank, engine, an employee, a song, a mathematical theorem. Entity Metadata is the collection of Entity Specs that have been defined for the system.

Attribute Metadata defines the characteristics that Entity Metadata can have where an attribute gives the details of an attribute for a given entity. An attribute of an entity or relationship is a particular property that describes the entity or relationship. The set of all possible values of an attribute is the attribute domain. An attribute can be thought of as adjectives describing a noun (e.g., a person can have a height). Height would be the Attribute Metadata. Tim's height is 6 feet tall is the value of the attribute. Attribute Metadata is the collection of Attribute Specs that have been defined in the system.

Metadata specifications are recorded in the database as Entity Specifications ("Entity Specs), Attribute Specifications ("Attribute Specs"), Relationship Specifications ("Relationship Specs"), Task Specifications ("Task Specs"), View Specifications ("View Specs"), Report Specifications ("Report Specs") and other items that collectively define the functionality and behaviors of the Application.

Metadata is one of the two elements, along with Administrative Data, that constitute the Control Data for the Application. Since the entire DBMS is controlled by this metadata, it includes much more detail than metadata encoded by a typical database application. The Metadata in a data model (a "Model") will have sufficient detail to produce the database schema for that Model along with additional specifications for workflow, access controls, and user help and support data for database editors. It is helpful to think of Metadata as a set of questions that the Model will eventually answer. It does not encode the answers to any of those questions but is used by the system to help the users to answer the questions.

Administrative data is data that is used to control access to the DMBS data, display data and to control work assignments within the DMBS. Examples of Administrative Data include Users, User Groups and Data Packages. This data will typically be initialized by the development team and then managed by one or more users from customer team.

A user group is a collection of users for which a common set of access control can be defined. In this context access controls pertain to the subset of data that they can view, the subset of data that they can modify and the subset functions that they can execute.

The data in the Model that controls the subset of the database that is visible to each user as they perform specific tasks is called a ViewSpec. The data in the Model that controls the specific steps for each task is called a TaskSpec.

In order to develop a set of ViewSpecs and TaskSpecs that are appropriate for each domain, the domain is first decomposed into a set of sub-models that reflect substantially self-contained elements of the overall model. For example, in a domain for a medical information system, typical sub-models would focus on "principles of chemistry", "principles of biology", "human physiology", "the respiratory system", "the digestive system", etc. Sub-models may also contain lower level sub-models. For example, the model for each of the systems of the body (e.g. respiratory, digestive, immune, etc.) may contain sub-models that describe, "normal functions", "organs", interactions", "diseases", "treatment" and "prevention." It should be recognized that there will typically be many sub-models within a data domain that are structurally equivalent. For example, all of the sub-Models for "diseases" (one for each body system) captures the data that is structurally equivalent. This would be so because the models all contain descriptions of changes to the composition of the organs, tissues or processes that result in loss of function and the symptoms associated with these changes.

The subject matter herein uses a data structure called a "Data Package" to represent the sub-models and a data structure called a "Data Package Specification" 94 to represent the common structures that are used by one or more Data Packages.

Data Packages are also referred to as "Concepts" which is nomenclature that is probably closer to their function description. A Data Package/Concept is used to define a subset of the database data that would be maintained by a single group or updated in a single task. For example an automobile may contain as many as 50 systems for which the structure of the Model (e.g. the set of entities, attributes and relationships to be specified) is equivalent but the Application Data for each system will be substantially different. In this example, each of the 50 systems would be a separate Data Package for which a separate group of users would be responsible for importing, editing and maintaining the Application Data for one or more of the systems. The specification of the Data Package Hierarchy 100 (See, FIG. 3) for a Model is a critical aspect of developing a new application and will usually reflect application-specific structures that correspond to the assembly of the monitored asset(s) and the organization of the producer of the asset and/or the maintainer of the asset. A Data Package Hierarchy 100 is the relationship organization between data packages that allows data access controls to be shared. This hierarchy 100 is organized as a tree where the tree nodes that contain additional subordinate nodes share their access control permissions with all of their subordinate nodes. For example, if a user 99 has access to one data package, they automatically have equivalent access to all data packages subordinate to that one data package.

Application Data is the specific set of instances for the entities, the values for their attributes and their interrelationships constitutes the Application Data for a Model. Non-limiting examples of Application Data in a maintenance environment are the specific set of functions performed by an asset, the set of failure modes for that asset, the occurrence rates of those failure modes and the set of relationships between failure modes, functions, symptoms and corrective actions. Application data may be thought of as the full set of answers to the questions asked by the Metadata of the Model.

Application Data for a Model is separated between Production Data and Change Package Data. All editing of Application Data occurs against constructs called "Change Packages". A Change Package includes a block of updates to the content of the Model which will be applied to the production Model as a single transaction which is called "release to production." Production Data is the result of "Change Package Data" for which the editing and auditing process is complete, has been reviewed for consistency and has been "Released" into the production data set.

In the definition of the Data Packages for an application, a database developer will encounter many sets of Data Packages that are structurally similar. An example would be that all of the sub-Models for "diseases" (one for each body system) captures the data that is structurally equivalent (e.g., they all contain descriptions of changes to the composition of the organs, tissues or processes that result in loss of function and the symptoms associated with these changes.) The data item for each set of Data Packages that share a common structure is called a Data Package Type.

Each Data Package Type is associated with one or more Viewspecs that reflect the user activities associated with creation, import, audit and finalization of the data for portions of the Model within the domain. These Viewspecs are used by the user interface to present the limited portion of the Model that is relevant to the user in performing a specific task in the overall knowledge base development process.

One or more Task Specifications ("TaskSpecs") are associated with each "ViewSpec" to control the sequence of steps that is required for the user in performing a specific task in manipulating the data in the database. A Task Spec is the portion of the Metadata of a Work Package Specification that controls the sequence of steps that must be performed to provide the Application Data for each Work Package that is governed by the Work Package Specification.

A Work Package Specification is a portion of the Metadata that specifies the structure and control data that will be used to create one or more Work Packages. For example, a Work Package Specification would be created to specify the structure and control data for the Work Packages that facilitates the Modeling for each of the 50 systems discussed earlier. It is important to recognize that the purpose of a Work Package Specification is to allow application designers and administrators to create templates for the creation of Work Packages by end-users who know what they want to do, but need help in the required sequence of steps to accomplish that objective. It is also important to know that part of a Work Package Specification is the specification of behaviors that are to be performed when a new Work Package instance governed by this Work Package Specification is created or released to production.

The combination of Data Packages, Data Package Specification 94, Task Specifications 13 ("TaskSpecs") and View Specifications 11 ("ViewSpecs") (See, FIG. 2) are used by the generic software to create the set of graphical user interface 80 ("GUI") screens that are presented to the user based on the set of tasks for which the user is responsible. This set of GUIs provides a complete set of interfaces needed by all users to create and modify their portion of the knowledge database (See, e.g., FIG. 6).

FIG. 1 is a block diagram of a simplified computer system commonly used to store and use a content data database 10 containing application data and a DBMS 20. The database 10 may reside in any suitable storage media known in the art or that may be developed in the future. The database 10 may reside anywhere on a network or may reside in a local computing device 50 operating the processor 60. The processor 60 operates KMS 25 that may access, change or otherwise manipulate the database 10 using a user interface device 70, which may be a keyboard, a joy stick, a mouse, trackball or any other user interface device known in the art or the may be used in the future. The computing device may be any computing device known in the art or that may be developed in the future. Non-limiting examples of computing devices may be desktop computers, laptop computers, cell phones, projectors and handheld personal computing devices of all types.

A database user may access the database 10 by utilizing a plurality of graphical user interfaces 80 that are displayed on a display device 90. The display device may be any display device known in the art or that may be developed in the future. Non-limiting examples of a display device may be a cathode ray tube display, a plasma display, an LCD display, and a hologram.

Figure 2:
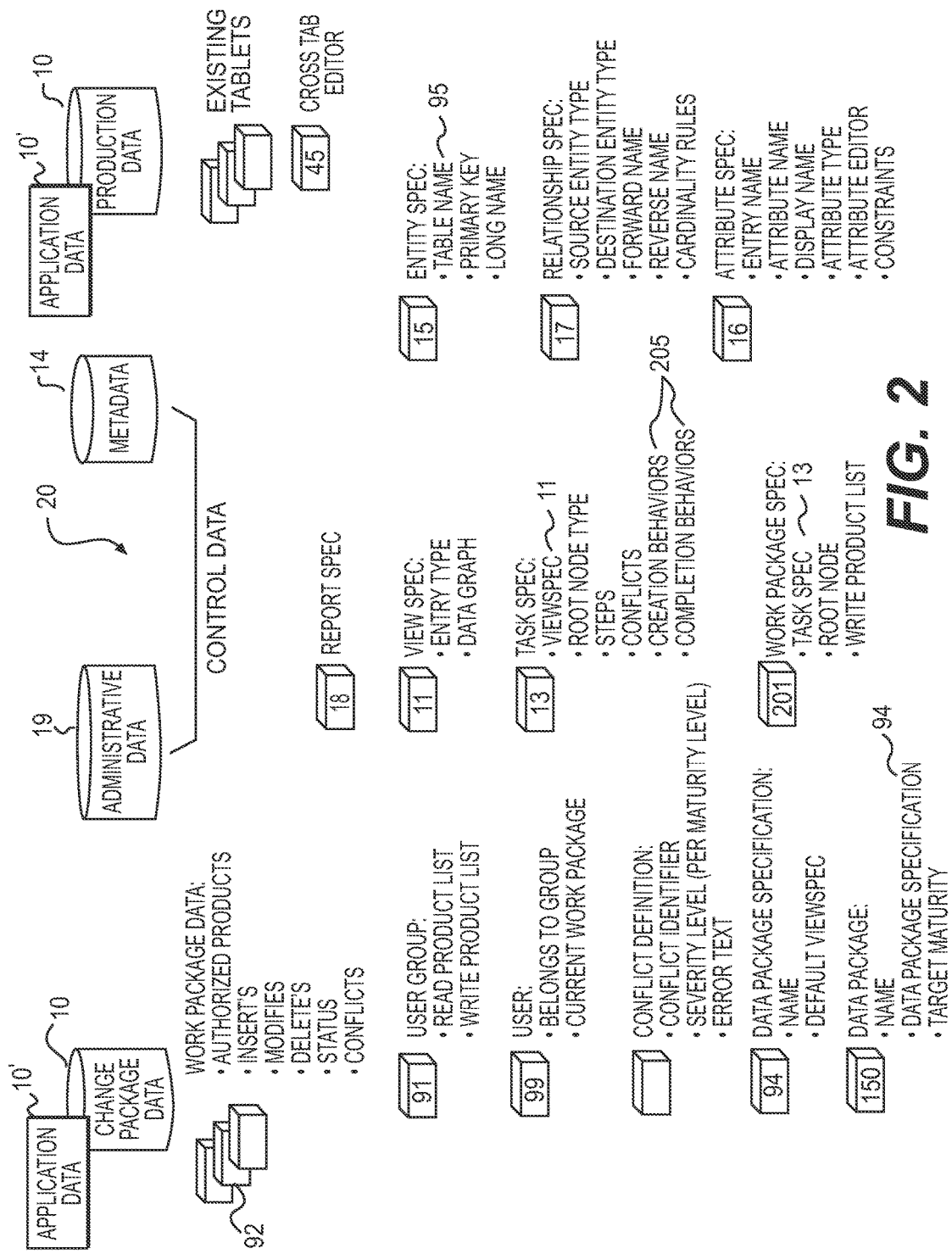
FIG. 2 is a conceptual organizational chart of the various schema implementing the complex user interface.
Figure 3:
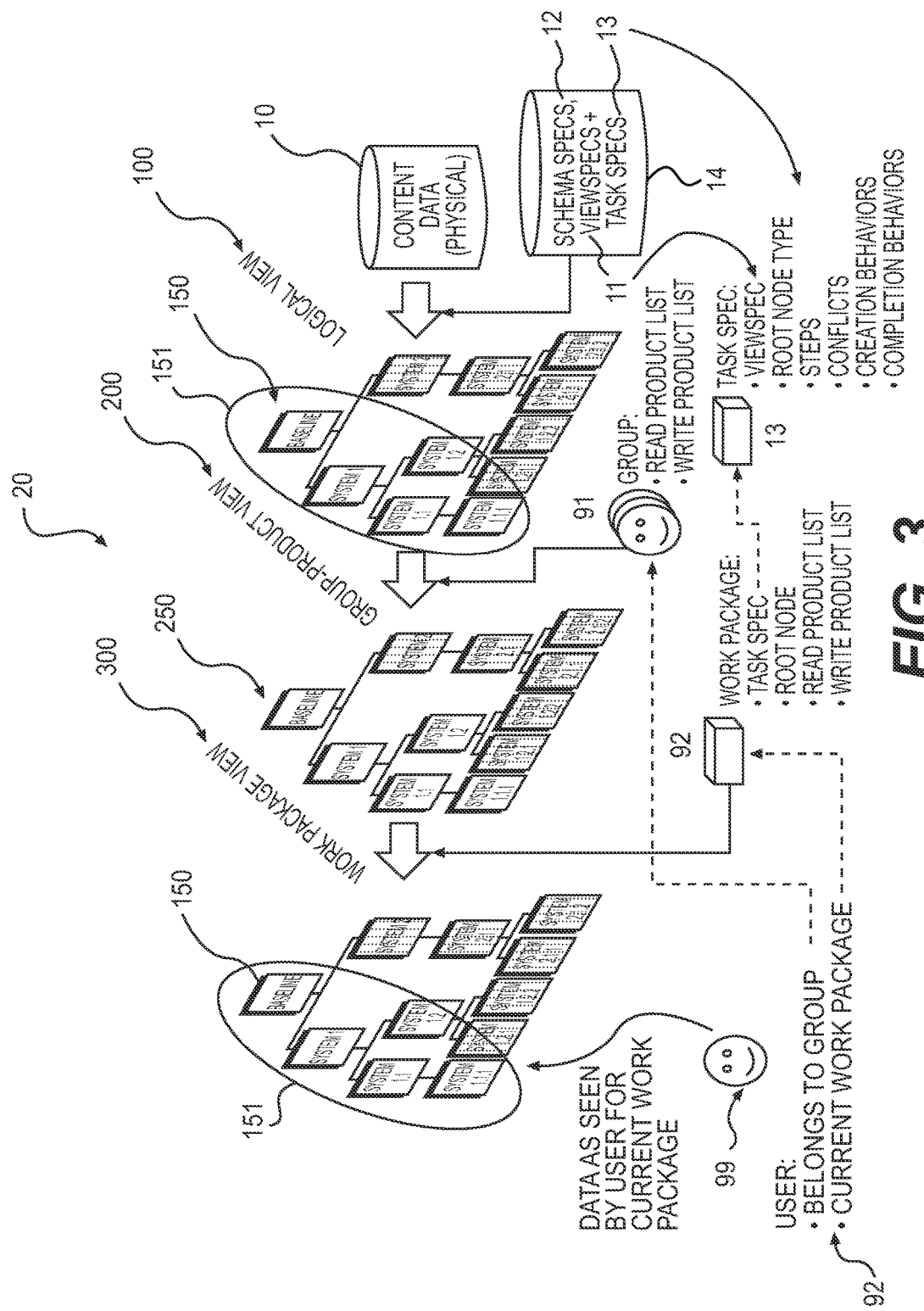
FIG. 3 is a conceptual process chart for converting raw application data into user specific Data Packages.

FIG. 2 is a chart laying out an overview of the data schema arrangements for generating View Specifications by the KMS. FIG. 3 is an overview of the KMS that may access the database 10 using a set of tools that are user friendly and that allow the conversion of unstructured and disparate data sources into an integrated data set that supports data driven inferences desired by an end user.

A specific user 99, as shown at the bottom left, has read access (shown as shaded box) and write access (as shown as white box) to a small portion of the database 10 at a given time. These portions of the database 10 are known as Data Packages 150, which are systems, sub-systems and elements which are related to each other by topic in a hierarchical manner. The portion of the database 10 for which user 99 has access is specified by a set of groups to which the User belongs and by a currently active work package. It is important to recognize that the portion of the database accessible to the user based on the work package limitations may be much smaller than the portion of the database accessible to the User 99 based on their Group association.

Figure 5:
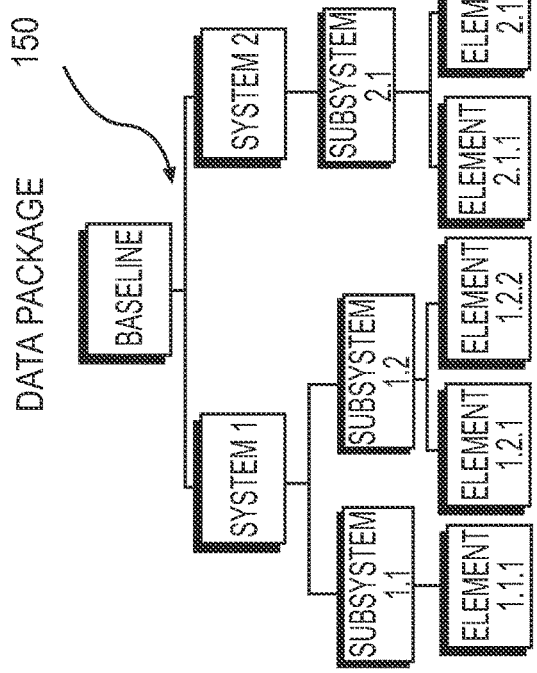
FIG. 5 is an exemplary conceptual rendition of a Data Package.

A "group" or "user group" is administrative data that identifies users 99 associated with one or more "Data Packages" 150 for which they will have read and or right access to the data in the database 10 that is associated with those "Data Packages" (See, FIG. 5 for an exemplary conceptual rendition of a Data Package). For example, an administrator may create a user group called "System-1 Developers" and specify that this group has "Write Access" to content data in the "System-1" Data Package. The user group data may be used by the KMS for access control and workflow control for a Data Package (See, FIG. 5 for an exemplary rendition of a Data Package).

"Content data" is stored in physical data tables in database 10. A table name is the name assigned to a physical table. It is how a DBMS or application accesses the content of the physical table.

Content data encodes entities, values for entity attributes, and relationships that are stored in data structures that support internal DBMS functionality rather than in structures that encode data terminology that is familiar to the end users. For this reason, much of the functionality within the KMS 25 is focused on converting the content data in its physical form that facilitates DBMS functionality into a form that is manageable in size and is understandable by the end-users authorized for read and write access. This is done by tailoring the content data to the confines of a specific work package. Non-limiting examples of content in the context of electro-mechanical asset maintenance would be the specific set of functions performed by an asset, the set of failure modes for that asset, the occurrence rates of those failure modes and the set of relationships between failure modes, functions, symptoms and corrective actions. One may consider content data as the full set of data to answer the questions asked by the metadata 14 of the content data in the database 10.

Much of the functionality of the KMS 25 relies upon the careful factoring of the content data in the database 10 into a number of "type specifications" that are related to each other through inheritance from other type specifications and the composition of those other type specifications. Using a hypothetical database application for American History for example, George Washington's military career could be factored into the French and Indian war period and the Revolutionary War period, further factored into different engagements that occurred during those periods and yet further factored into other sub-type specifications related to those engagements.

A significant difference between the instant subject matter and a traditional database application is that in regard to the current subject matter, a large percentage of the type hierarchy (i.e., data relationships/factoring) is not known at design time. Instead, this portion of the type hierarchy is created by end users as they record/input the content data into database 10. It should be emphasized the type specifications for the system metadata 14 are developed by a system designer, while type specifications for the content data in database 10 itself are developed by a user 99 that may have no database development skills.

Referring again to FIG. 2, a "work package" 92 is administrative data, which comprises a "specialized change package." A "specialized change package" facilitates the development of specific portion of the database content. A work package 92 is associated with a specific Data Package 150, view spec 11, a report spec 18, and task spec 13. For example, a work package 92 may be created to enter and audit data from a failure mode and failure effects analysis as a part of the database 10 content development for a particular complex system. It is useful to think of a work package 92 as a container of data and an associated wizard that assists the user in populating the appropriate data for the container.

A "work package specification" 201 is a portion of the metadata 14 that specifies the structure and control data that will be used to create a work packages 92. For example, a work package specification 201 may be created to specify the structure and control data for the work package 92 that facilitates the modeling of a subsystem of an electro-mechanical system. The purpose of a work package specification 201 is to allow application designers and administrators to create templates for the creation of work packages 92 by users 99 who know what they want to accomplish with their data, but need help in the required sequence of steps to accomplish that objective. Part of a work package specification 201 is the specification of behaviors that are to be performed when a new work package 92 instance governed by its work package specification 201 is created.

Work packages 92 may be sequenced together. Since a Work Package Specification 201 specifies behaviors that are to be performed when a new Work Package instance governed by that Work Package Specification is created, the specified behaviors can be to create new, derived Work Packages. A sequence of Work Packages arising from an initial event may be considered as a network of work packages. An example of a task network is a sequence of Work Packages that arise from the receipt of a bill of lading.

A "change package" includes a block of data updates to the content of the database that will be applied to the database as a single transaction which is called a "Release To Production". "Change package data" is data for which an editing and auditing process is complete, has been reviewed for consistency and has been released to production.

The database 10 also includes metadata 14 which is data about the data in the database. Metadata 14 comprises structure specifications entities, attributes and relationships associated with the data. Metadata specifications are recorded in the database as "entity specs" 15, "attribute specs" 16, "relationship specs" 17, "task specs" 13, "view specs" 11, "schema specs" 12, "report specs" 18 and other items that collectively define the functionality and behaviors of the KMS 25. Since the entire KMS 25 is controlled by the metadata specifications 14 include much more detail than metadata encoded by a typical database application. The metadata specifications 14 in KMS 25 has sufficient detail to produce the database schema along with additional specifications for workflow, access controls, user help and support data for DBMS editors such as a cross tab editor 45. It is helpful to think of a metadata specification as a set of questions that the database 10 will eventually answer. The metadata specifications 14 do not encode the answers to any of those questions but is used by the KMS 25 to help the users 99 to answer the questions.

An "entity" is a specific physical data table structure grouping a set of data elements that have a repeatable set of properties. Non-limiting examples of entities for a maintenance database may include functions, failure modes, symptoms and repairs.

An entity specification (or "entity spec") is a definition of a given entity. An entity spec lists the attributes and relationships that apply to the entity along with other properties of the entity spec. Non-limiting examples of data in an entity spec include Long Name, Description, primary key, and for maintenance related KMS systems, "Failure Mode Affects Function." A primary key is a unique identifier in an entity spec that identifies a unique entity. The primary key is utilized to create "relationships" (defined above) from that entity to other entities.

An "attribute" is the subset of the properties for each entity whose values are basic data types such as text, numbers or binary objects. Non-limiting examples of attributes in a maintenance database may include the names of the entities, the failure rate of the failure modes and the instructional text for the corrective actions.

An "attribute specification (or "attribute spec") is the definition of a given attribute. An attribute spec lists the properties for an attribute. Non-limiting examples include an attribute type and a size of the attribute in bits. A human readable version of the attribute specification is a "display name." The display name includes spaces and punctuation where applicable. An "attribute type" is a data type, such as a number, string, references, Boolean logic, etc. An attribute constraint is a data field constraint. Non-limiting examples include a mandatory constraint, a minimum value, a max value, etc.

Attributes are changed using a specific attribute editor, of which there are several types. Attribute editors may include pick list, multi select list, text (no formatting), long text (with formatting) and a reference item selector.

A "relationship" is a subset of properties for each entity whose values are pointers to other entities. Non-limiting examples of relationships that may be used in a maintenance database include set of symptoms produced by each failure mode and the corrective action for each failure mode. Most relationships may be edited. In some cases, many-to-one relationships are presented to the user 99 along with attributes in the editor from the "many" side since the relationship can only contain a single value from this side.

A "relationship specification" (or "relationship spec") is the definition of a given "relationship". A relationship spec lists the properties for the relationship along with its associations to entity specifications, defined above. Optionally, relationship specs themselves can also have attributes which are specific to the relationship connecting two entities. Non-limiting properties include parent entity specifications, child entity specifications and attribute specifications.

The forward name is the name of the "relationship" displayed to a user when editing the relationship from the source entity to the destination entity. The "forward name" is similar to the name of the"relationship spec," except that it has spaces and other content for human readability. For example the relationship name FailureModeCausesSymptom would be changed to read "Failure Mode Causes Symptom" by a human.

The reverse name is the name of the relationship displayed to the user 99 when editing the relationship from the destination entity to the source entity. For example the relationship name FailureModeCausesSymptom would be changed to read "Symptom caused by Failure Mode" by a human.

The Schema Specifications 12 ("Schema Specs") and View Specifications 11 are used by the KMS 25 to convert the data (as stored in relational database tables) into a logical view of a Data Package Hierarchy 100 which shows entities and relationships using terminology and structures that are familiar to the end user rather than the structure encoded within the KMS 25.

A "schema specification" (or "Schema Spec") defines a set of logical entities within the data model. While an entity spec (defined above) defines a specific physical table structure, a schema spec defines a logical compartmentalization of data from that table. The schema spec allows the KMS 25 to display items representing those logical entities separately. The logical entities will contain a subset of the "attributes" and "relationships" that are valid for an entity spec.

A "view specification or "view spec" is user definable metadata 14 that specifies the subset of Application or Content Data that is viewable to user from the perspective of a Data Package, Work Package or report that allows a user 99 to select attributes and data definitions, assign them to user defined hierarchical levels and then link the data definitions such that the a second data definition operates as a sub-query for a first data definition.

A Viewspec can be used by many different Data Package Specifications 94, Work Package specifications 201 and Report specifications 18. An example of a Viewspec is the set of entities, attributes and relationships that can be used to navigate through the application data 10' concerning a system and edit its contents.

Exemplary application data in database 10 may be Failure Mode and Effects Analysis (FMEA) data for a particular system. The complete data for the FMEA can be viewed using one or more Viewspecs. Entities may be System, LRU, Failure Mode, Symptom, and Function. The attributes may be system name, LRU name, failure mode name, failure mode rate, symptom name, symptom false alarm rate, function name and function criticality. The relationships may be "System Contains LRUs," "LRU contains Failure Modes," "Failure Mode causes Symptom," and "Failure Mode effects function."

A Data Package Specification 94 is a definition of a type of a data package that grants the access controls for that type. The Data Package Specification 94 allows multiple different data packages to be defined with the same set of controls easily. A specific example of a Data Package Specification 94 could be the specific FMEA data for each system on a vehicle (i.e., Fuel Management, Power generation, Propulsion, Steering, Braking, etc.). Each Data Package includes additional data to specify the set of users that can modify the data in that particular data package. The Data Package Specification 94 specifies the data structure to contain the data for a specific FMEA ad to map it the physical data structures in the data 10'.

A Report Specification comprises metadata that defines the layout of the data from the specific data subset domain 151 as rendered to the display device or onto paper. A single viewspec can have multiple report specifications that give different layouts for rendering the viewspec content to the user.

An Example of a Work Package would be the task assigned to a specific user to create the FMEA data for a single system. The Work Package specification 201 would include the Viewspec and a Write Data Package List that would be assigned to a user 99 to create the FMEA data for any system.

In other words, a view spec 11 specifies a subset of content data of data base 10 that is viewable to particular user that is associated with a Data Package, Work Package or report. A view spec 11 also performs terminology mappings (aka "Aliases") that convert DBMS standard terms to terms that are familiar to a given user 99. For example, the term "module" may be mapped to the term "LRU" for one user and "ECU" to another user. The mapping is accomplished using generic editors. A non-limiting list of generic editors includes grid editors, entity editors, crosstab editors, relationship editors and graphical Modeling tools.

A data definition may be described as a query with filters that combines one or more entities and selected attributes and may be identified with a specific name, such as "symptoms" or "symptom causes failure modes."

A "task specification" or "task spec" is that portion of the metadata 14 associated with a Work package specification 201 that controls the sequence of steps that must be performed to locate and provide the content data for each work package 92 that is governed by the work package specification.

Figure 4:
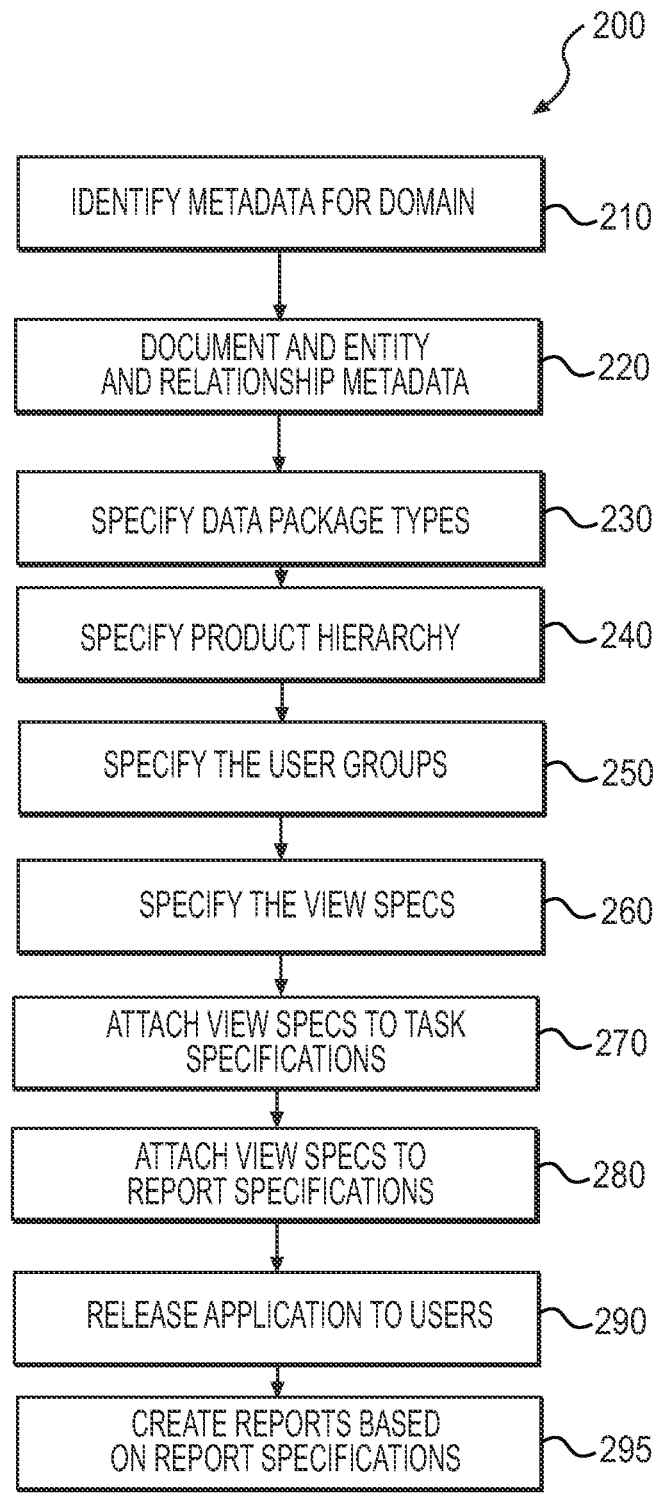
FIG. 4 is a flow chart of an exemplary method to create the complex user interface.

FIG. 4 describes an exemplary sequence of steps 200 to implement the inventive concepts described herein. At process 210 the Metadata 14 for the domain of data 10' of concern is identified. When the one or more Viewspecs are provided for an existing data source 10', the basic metadata 14 for the domain is created or obtained. This metadata 14 comprises the definitions of all entity types 15, attribute types for the data that is to be displayed, relationship types and primary keys. Metadata 14 may be created using any suitable commercial tool for creating Entity Relationship Models for a relational database.

Once the Metadata 14 had been identified, it needs to be loaded into table structures that are used by the system at process 220. This can be an automated import or a manual entry using editors. Such tables that are characteristic of the subject matter described herein are the Entity Specification, which comprises the Table Name 95, the Primary Key, and the Long Name; the Relationship Specification, which comprises the Source Entity Type 15, Destination Entity Type 15, Forward Name, Reverse Name and Cardinality Rules; and the Attribute Specification, which comprises the Entity Name, the Attribute Name, the Display Name, the Attribute Type, the Attribute Editor and Constraints.

The next step is to partition the application data into Data Package Types at process 230 that are associated with recurring patterns of import, audit and authoring in the application data. For example, a FMEA application would have a Data Package Type to contain a Bill of Materials (BOM) for a vehicle and another Data Package Type to contain the Failure Modes and Effects for each assembly identified in the BOM.

The Application data is partitioned into Data Packages 150 at process 240, where each Data Package is associated with a single Data Package Type. For Example, a FMEA application would have one Data Package 150 to contain the BOM hierarchy for a vehicle and a large number of Data Packages 150 to contain each of the Failures and effects of each assemble identified in the BOM. It should be noted at this point that data base developers may iterate between processes 230 and 240 until all of the data that the knowledge base will contain is mapped to a Data Package 150 and all Data Packages 150 are associated with a single Data Package Type 201.

At process 250, User Groups 91 are associated with the read and write access to each Data Package 150. It should be pointed out for clarity that a Data Package 94 may be thought of identifying Data Packages 150 that exist at the same horizontal slice of the Data Package hierarchy 100, while User Groups 91 identify a grouping of Data Packages that exist in the same vertical slice of the Data Package hierarchy 100.

At Process 260, the ViewSpecs 11 that will be associated with each Data Package Type 94 will be specified. A database developer creates a separate Viewspec 11 for each subset of Data Package Type 94 that would be presented to the user 99 to support specific editing and auditing tasks. In developing an exemplary FMEA for an assembly, the user 99 may want to view the data from the perspective of Failure Modes and the effects that they produce. At another point in the analysis, the user 99 may want to view all of the effects and then see the Failure Modes that produce those effects. These two ways of viewing the same data are specified through two separate ViewSpecs 11 that would be associated with the Data Package.

An element of a Viewspec 11 is a Data Graph, which specifies a set of Entities and Relationships that should be included in the Viewspec. In a FMEA example, where the purpose of the data view output is to display Failure Modes and Effects, the Data Graph would contain the following exemplary relationship structure:

Entity Type: Assembly XYZ
Relationship Level 1: Assembly XYZ contains Assembly XYZ1
Relationship Level 1: Assembly XYZ has Failure Modes
Relationship Level 2: Failure Mode causes Effects This exemplary Data Graph instructs display rendering software to expect one or more Assembly items from which to construct the data that will be presented to the user 99. Here, each the Data Graph instructs the software to retrieve the list of all subordinate Assemblies and the failure modes associated with this particular Assembly. For each Failure mode, the Data Graph instructs rendering software to retrieve the list of all Effects caused by each Failure Mode.

At process 270, the Viewspecs 11 are attached to task specifications. Once the Viewspecs 11, Data Packages 150, Data Package Specifications 94 and User Groups 91 have been defined, a developer can create Task Specifications 13 that define how a specific User Group 91 will edit the data in a Data Package Type using a ViewSpec 11 to control the data that they will see while performing the task. A Task Specification 13 also identifies the specific steps associated with the overall task and the consistency checks that can be performed when the task is complete. Consistency Checks ensure that the data in the Data Package meets the quality constraints defined for the Entity Specification 15, Attribute Specification 16 and Relationship Specification 17 defined in the Data Package 150.

At process 280, the Viewspecs 11 are also attached to Report Specification ("Reportspec"). A Viewspec includes a Data Graph. A Viewspec 11 is a convenient basis for generating reports that will typically navigate the same Entity Types 15 and Relationship Specs 17 as are already being navigated by the Viewspec 11. The Viewspec 11 becomes the basis for a Report Specification 18 and then adds page layout details to the Report Spec 18.

At Process 290 the DBMS application 20, including the Viewspecs, Taskspecs and Reportspecs, are released for use by User 99 for use at Process 295. As user 99 interacts with the KMS 25, they create Work Packages 201 that are used to guide the editing of data 10' in a Data Package 150 based on one of the Taskspecs 13 that are applicable to the to the Data Package Type 94 associated with the Data Package 150.

At process 295, user 99 creates reports based on the Report Specifications created and attached to the Viewspec 11 in process, that are used to document the contents of the application data in the database 10. The reports generated are based on the Viewspec 11 and one or more data entry points supplied by the user 99 when the report is requested.

In some embodiments, working on one Data Package 150 may result in the creation of new, lower level Data Packages 150. For example, a user 99 editing the data 10' for System 1 may identify that System 1 contains two subordinate Data Packages—Subsystem 1.1 and Subsystem 1.2. These subordinate Data Packages are automatically created by the TaskSpec 13 using data recorded in the "completion behaviors" elements 205 of the Taskspec.

The Completion Behavior element 205 comprises instructions in the form of a structure list of Entity Types 15 (e.g., Assembly XYZ) and associated Data Package Types 94. The instructions create a new, subordinate Data Package 150' with the specified data Package Type 94 for each new instance of the specified Entity Type 15 created in the parent Data Package 150. For example, the completion behavior 205 for a "Create System" Taskspec 13 could include:

"Entity Type 15: Subsystem, Associated Data Package Type: Subsystem DP,"

"Entity Type: Element, Associated Data Package Type: Element DP."

These instructions indicated that a "System" may contain either Subsystems or Elements as subordinate data that should be mapped into new Data Packages 150'.

The above steps allow a domain expert to create a complex user interface that is tailored to their specific data subset domain 151 within a database 10' without the need to write new software. The results of the preceding steps of the method 200 are recorded into a predefined metadata structure and an administrative data structure 19 that are then interpreted by generic software 61 executing on a processor 60 to produce domain specific pages of the GUI 80.

Figure 6:
FIG. 6 is an exemplary graphical User Interface (GUI) that may be used to create a Viewspec.

FIG. 6 is an exemplary GUI 80 that may be used to create a Viewspec 11 by a user 99. After establishing all of the data definitions discussed above required to support a Viewspec 11, the Viewspec can be built by associating these data definitions. The GUI 80 allows the user 99 to pick a data definition at a first level and the select a subsequent data definition that can be linked with the first data definition such that the second data definition acts as a sub-query for the first data definition. The constructed Viewspec 11 can then be named and stored for future use.

As can be seen from inspection of FIG. 6, the first level of inquiry/report is "VS-1 Symptoms." The second or subordinate level of inquiry is data concerning symptoms and those failure modes that cause the symptoms. An additional second level of inquiry concerns the interactive tests for those symptoms that cause the failure modes. The Viewspec does not contain or store data in any of the underlying application database tables 10'. The data for the date definitions is a subset of the application data in database 10. The Viewspec 11 prospects for pieces of pertinent information from different existing tables that is only pertinent to the user's Data Package 150 and Work package 92.

Figure 7:
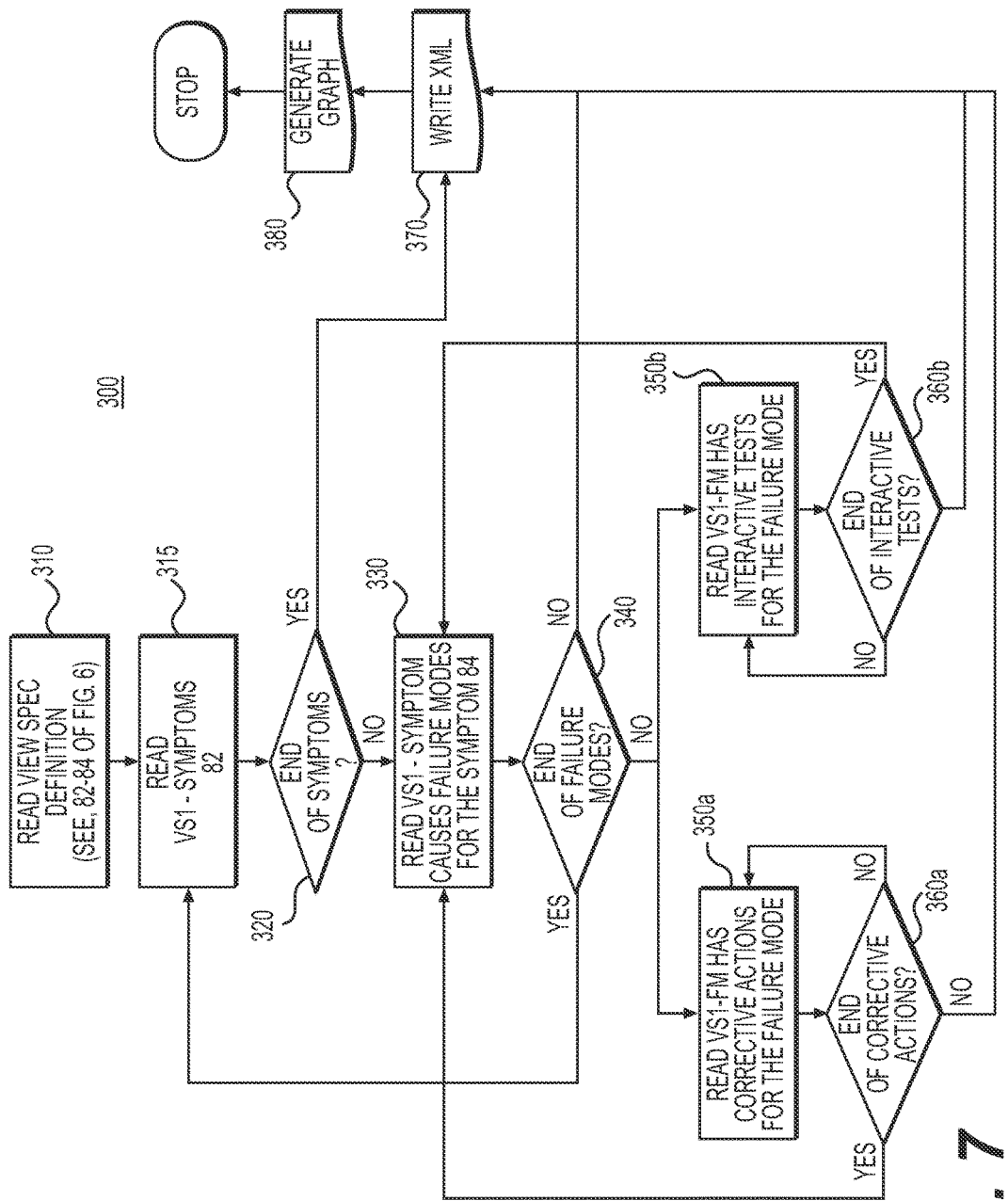
FIG. 7. is an exemplary logic flow diagram of a method of using a Viewspec.

FIG. 7 is a an exemplary logic flow diagram of a method 300 of using a view spec to render data to the user 99 based on the exemplary GUI 80 of FIG. 6. The method 300 begins at process 310 where the view spec 11 is read by the suitably programmed processor 60. The view spec 11 may be configured to assemble data for the main Model (symptoms) 82 and the sub-Models ("Symptoms Causes Failure Modes" 84, "FM has Corrective Action" 86 and "FM has Interactive Tests" 88).

At process 315 the database 10 is searched for symptoms. If the symptom located is not the last symptom in the database then the method proceeds to process 330. If it is, then the method moves to process 380 where a graphical representation of the results is presented to the user.

At process 330, the failure modes related to the symptom 82 being searched are searched for. If the failure mode associated with the symptom is the only or last Failure Mode then the method returns to process 315 to read the next symptom 82 in the database 10. If not, then the failure mode data is written to XML format at process 370 and added to the graphic display at process 380. Also, if the failure mode associated with the symptom is the only, or the last, Failure Mode then the method proceeds to process 350 where additional information about the symptom 82 is located. As an example, "Corrective Actions for the Failure Mode" 86 and "Interactive Tests for the Failure Mode" 88 are being queried for in the View spec of FIG. 6. However, those of ordinary skill will recognize the plethora of possible sub-Model data types that may be chosen as part of a View Spec 11.

At processes, 350*a* and 350*b* the method 300 searches for sub-Model data for Corrective Actions and Interactive Tests, when found is written to XML and then added to the display graph in processes 370 and 380. The display graph will be actually generated when the last symptom is read at process 315/320. Process 360*a* and 360*b* test to determine if all of the related Corrective Actions 86 and Interactive Tests 88 have been located. The processes of the method 300 are iteratively nested such that when the last data from a sub-Model (84, 86, 88) is located for the last Symptom 82, a data graph is generated for the user 99.

Figure 8:
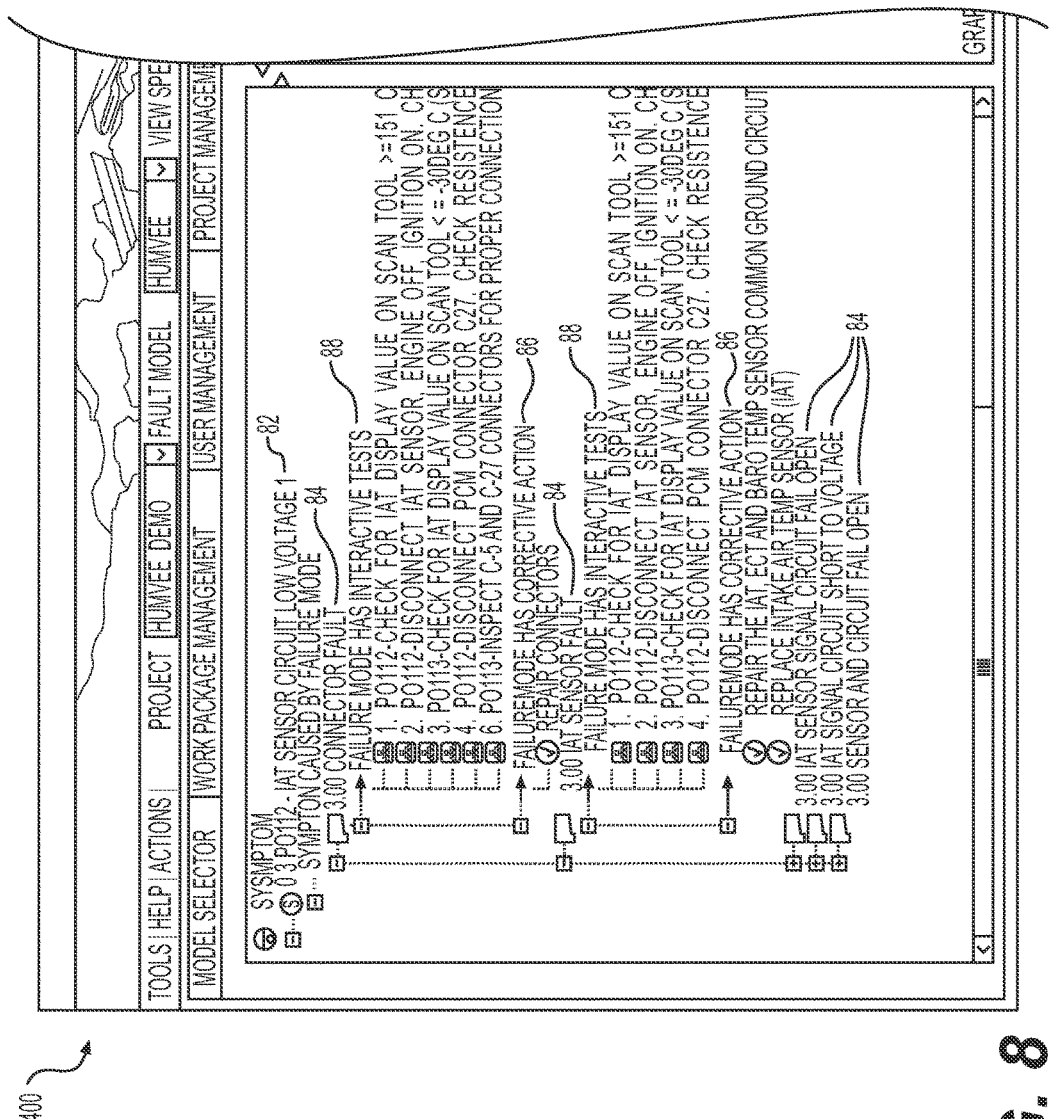
FIG. 8 is an exemplary display generated by a Viewspec.
Figure 8:
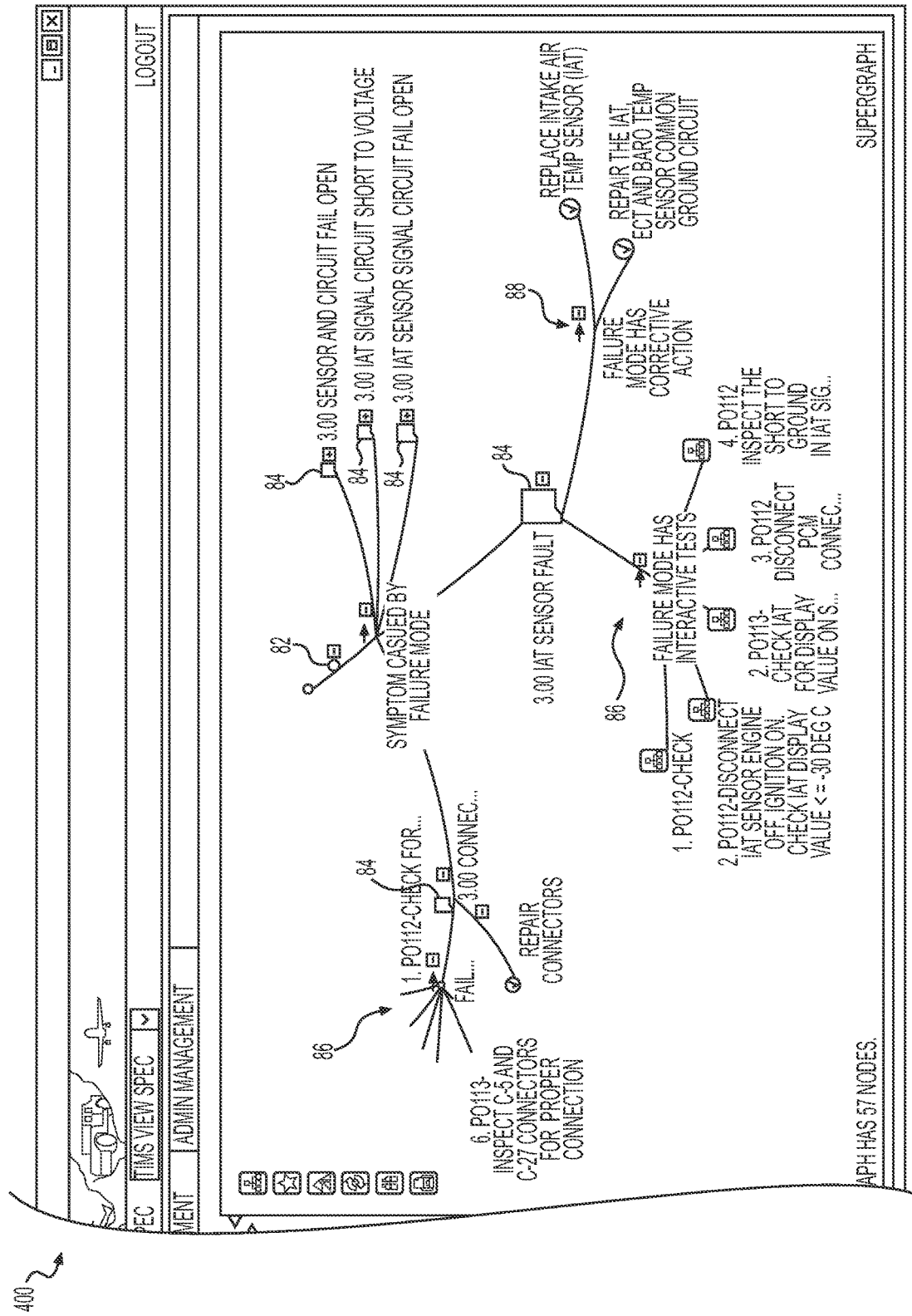

FIG. 8 is an exemplary graphical depiction 400 of the data defined by and queried for by the Viewspec 11 of FIG. 6. The graphical depiction 400 comprises a "data tree" representation on the left side of the display and a tree and branch depiction of the same data on the right side of the display. Here the exemplary main data (e.g., "symptom") 82 is Low Voltage on the IAT Sensor Circuit. The failure modes associated with the symptom 82 are 1) a Connector Fault, 2) and IAT sensor fault, 3) an IAT Sensor Circuit Fail Open, 4) and IAT Signal Circuit Short to Voltage, and 5) Sensor Ground Circuit Fail Open. Representative interactive tests 88 and the corrective action 86 are listed in the data tree and the tree-and-branch representation of FIG. 8.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computer executed method for creating a complex graphical user interface on a display device via generic computer readable database software executable on a processor to manage only a specific data subset domain of application data in a database, the method comprising:

specifying a structure of a complex data model for a customer application, the structure comprising a plurality of attribute specifications, a plurality of entity specifications and a plurality of relationship specifications for the complex data model, wherein each of the plurality of entity specifications comprises a table having a plurality of rows and columns, each row of the table defining an entity of the customer application, each column of the table being defined by one of the attribute specifications, and wherein each relationship specification defines a type of relationship allowed between the entities of the customer application within each of the plurality of entity specifications;

specifying a process defining how to populate each table of the entity specification, the process comprising:

a task specification defining a sequence of tasks to populate each table of the entity specification; and a view specification specifying a subset of the rows and columns of each table of each entity specification which are viewable and populatable during each task of the sequence of tasks; and automatically generating a customized software application for creating the complex data model having the complex graphical user interface, wherein the complex graphical user interface is customized based upon the specified structure of the complex data model, the task specification; and the view specification, the customized software application, when executed, presenting a sequence of the complex graphical user interfaces each controlling at least one task of the sequence of tasks to populate each table of the entity specification.

2. The method of claim 1, wherein metadata for the complex data model defines definitions for all entity types, attribute types, relationship types and primary keys for the application data being displayed.

3. The method of claim 1, wherein the entity specifications comprise a table name, a primary key and a long name.

4. The method of claim 1, wherein the Relationship specifications comprise a source entity type, a destination entity type, a forward name, a reverse name and cardinality rules.

5. The method of claim 1, wherein the attribute specifications comprise an entity name, and attribute spec, a display name, and attribute type and attribute editor and constraints.

6. A computer program product recorded on a non-transitory storage medium comprising steps for creating a complex graphical user interface on a display device via generic computer readable database software to manage only a specific data subset domain of application data in a database, the steps comprising:

specifying a structure of a complex data model for a customer application, the structure comprising a plurality of attribute specifications, a plurality of entity specifications and a plurality of relationship specifications for the complex data model, wherein each of the plurality of entity specifications comprises a table having a plurality of rows and columns, each row of the table defining an entity of the customer application, each column of the table being defined by one of the attribute specifications, and wherein each relationship specification defines a type of relationship allowed between the entities of the customer application within each of the plurality of entity specifications;

specifying a process defining how to populate each table of the entity specification, the process comprising:

a task specification defining a sequence of tasks to populate each table of the entity specification; and a view specification specifying a subset of the rows and columns of each table of each entity specification which are viewable and populatable during each task of the sequence of tasks; and automatically generating a customized software application for creating the complex data model having the complex graphical user interface, wherein the complex graphical user interface is customized based upon the specified structure of the complex data model, the task specification; and the view specification, the customized software application, when executed, presenting a sequence of the complex graphical user interfaces each controlling at least one task of the sequence of tasks to populate each table of the entity specification;

user interfaces each controlling at least one step for creating the model.

7. The method of claim 1, wherein the specified process further comprises:

a user group specification, the user group specification defining which tasks of the sequence of tasks are viewable and executable by users of the user group.

8. The method of claim 1, wherein the specified process further comprises:

a data package specification, the data package specification defining an organizational hierarchy of the plurality of attribute specifications, the plurality of entity specifications and the plurality of relationship specifications for the complex data model.

9. The computer program product of claim 6, wherein the specified process further comprises:

a user group specification, the user group specification defining which tasks of the sequence of tasks are viewable and executable by users of the user group.

10. The computer program product of claim 6, wherein the specified process further comprises:

a data package specification, the data package specification defining an organizational hierarchy of the plurality of attribute specifications, the plurality of entity specifications and the plurality of relationship specifications for the complex data model.

* * * * *